United States Patent [19]

Loveland

[11] 4,372,166
[45] Feb. 8, 1983

[54] FLOWMETER SYSTEM WITH DIGITAL PHASE SHIFTER AND CALIBRATION

[75] Inventor: Robert S. Loveland, West Covina, Calif.

[73] Assignee: The Perkin-Elmer Corporation, Norwalk, Conn.

[21] Appl. No.: 224,723

[22] Filed: Jan. 13, 1981

[51] Int. Cl.³ .............................................. G01F 1/66
[52] U.S. Cl. .............................................. 73/861.28
[58] Field of Search ............ 73/861.27, 861.28, 861.29, 73/861.31

[56] References Cited

U.S. PATENT DOCUMENTS 4,164,865  8/1979  Hall et al. ......................... 73/861.27

Primary Examiner—Herbert Goldstein
Attorney, Agent, or Firm—S. A. Giarratana; E. T. Grimes; T. P. Murphy

[57] ABSTRACT

A flowmeter system having a device defining a path for confining the flow of a fluid medium therethrough, first and second transducers disposed along said flow path for generating and receiving acoustic compression waves in the fluid medium between the transducers, a phase lock loop transmit/receive system including a voltage controlled oscillator for adjusting the frequency of the acoustic compression waves to maintain the compression wave length constant, a phase detector for measuring the phase difference of the received acoustic compression waves relative to that transmitted and for producing a sum signal proportional to the sum of the measured phase differences to vary the output of said voltage controlled oscillator, circuitry for producing a difference signal proportional to the difference of the measured phased differences representing the direction and magnitude of the flow of the fluid medium as well as changes in its composition, and circuitry for adjusting the phase of the transmit signal during initial calibration to compensate for variations in transducer elements and to calibrate the system for use without the need of an external flow source.

9 Claims, 3 Drawing Figures

4,372,166

FLOWMETER SYSTEM WITH DIGITAL PHASE SHIFTER AND CALIBRATION

RELATED APPLICATIONS

U.S. application for patent entitled "Flowmeter System with a Synchronous Clock for Generation of Timing Signals" by R. S. Loveland, filed even date herewith, Ser. No. 224,783.

U.S. application for patent entitled "Flowmeter System With Ultrasonic Energy Improvement in Equilibration" by R. S. Loveland, filed even date herewith, Ser. No. 224,785.

U.S. application for patent entitled "Flowmeter System With Improved Dynamic Range" by R. S. Loveland, filed even date herewith, Ser. No. 224,725.

U.S. application for patent entitled "Flowmeter System With Improved Loop Gain" by R. S. Loveland, filed even date herewith, Ser. No. 224,724.

BACKGROUND OF THE INVENTION

This invention relates to acoustical flowmeter systems and is particularly directed to an improvement in the acoustical flowmeters of the type described and claimed in the U.S. Pat. No. 4,003,252 entitled "Acoustical Wave Flowmeter" by E. J. DeWath which issued Jan. 18, 1977 and the flowmeter system of the type described and claimed in the U.S. Pat. No. 4,164,865 entitled "Acoustical Wave Flowmeter" by L. G. Hall and R. S. Loveland which issued August 21, 1979.

The invention of DeWath was directed to a flow meter having an unobstructed tubular wall thereby eliminating all impediments to the flow path of the fluid and eliminating all cavities in which debris might collect. The advantages of such a configuration is fully set forth in the DeWath Patent. To measure flow of a selected fluid in the DeWath flowmeter, however, required a calibration for that particular fluid and required a recalibration if the flow of a different fluid was to be measured since the flowmeter was not responsive to changes in fluid species or densities.

The Hall and Loveland invention improved the DeWath flowmeter by providing a flowmeter that measured flow accurately regardless of changes in fluid composition or temperature and by providing a flowmeter with a means for determining a change in velocity of sound of the fluid being measured.

In order to accomplish this, the Hall and Loveland acoustical wave flowmeter system had two spaced apart crystal transducers in the wall of the flowmeter conduit (sometimes called a cavity) to produce ultrasonic acoustic compressions at selected frequencies in the fluid within the cavity. The transducers were alternately switched into a transmit and a receive mode to generate upstream and downstream transmitted and received signals with an automatic means to adjust the transmitted frequencies to compensate for changes in velocity of the acoustic compressions in the fluid caused by changes in fluid composition and temperature. The electronic circuitry involved in the Hall and Loveland flowmeter system include means for measuring and storing signals representing the phase difference between the transmitting transducer signal producing the acoustic compressions and the signal produced by the receiving transducer during each of two successive transmit/receive cycles. Circuit means were provided to determine the difference between the signals representing the two successive phase differences wherein the sign of the difference corresponds to the direction of the fluid flow and the magnitude of the difference corresponds to the rate of fluid flow through the flowmeter. Circuit means were also provided to add the two successive phase difference signals together to obtain a signal proportional to the velocity of sound in the fluid moving through the flowmeter. This latter signal indicated the change in composition of the fluid flowing through the meter.

The Hall and Loveland flowmeter system had a phase lock loop in the receiver/transmitter system which included a phase adjustor comprising two operational amplifiers (8043C) and associated components. This phase adjuster was used during initial calibration to align the transmit and received signals to a 90° relative phase difference. Without this phase shifter, this coincidence of signals would not be achievable.

The problem, however, is that as the frequency of the transmitted signals changed, the phase adjuster also changed its output which represented an error. The net result is that the circuitry made an adjustment for this error as if the velocity of sound through the fluid medium was changing. In other words, the VCO would automatically adjust the frequency to make up for the phase error produced by the phase adjusting circuit. Accordingly, it can be seen that there was a need for a phase shifter which was insensitive to frequency changes.

Another problem with the circuitry of the patented system was that the only way the system could be calibrated was to provide a fluid flow of a known fluid at a known flow level through the transducer, measure the result, and calibrate the system. There exists a need to calibrate the system without an external flow source and this invention accomplishes this need.

Accordingly an object of this invention is to provide a phase shifter which is insensitive to frequency changes in the system and to provide a self calibrator by which the system can be calibrated without the need of an external fluid flow source.

SUMMARY OF THE INVENTION

The flowmeter system which meets the foregoing object comprises means defining a path for confining the flow of a fluid medium therethrough, first and second transducers disposed along said flow path for generating acoustic compression waves in the fluid medium between the transducers, a phase lock loop transmit/receive system including means for automatically adjusting the frequency of the acoustic compression waves to maintain the compression wave length constant in the fluid medium, means for measuring the phase difference of the acoustic compression waves transmitted upstream and downstream relative to that received and for producing sum and difference signals dependent upon the difference between the transmit and receive phases and transmitting said signal to said means for automatically adjusting the frequency of the acoustic compression waves, means for generating signals representing the direction and magnitude of the flow of the fluid medium as well as changes in the velocity of sound in the fluid medium, and a new and improved digital phase shifter and calibrator which is insensitive to frequency for initially aligning and calibrating the system for use.

Other and additional objects and advantages of this invention will be apparent to those skilled in the art after a study of the drawings and detailed description of the invention which follows.

DETAILED DESCRIPTION

Figure 1:
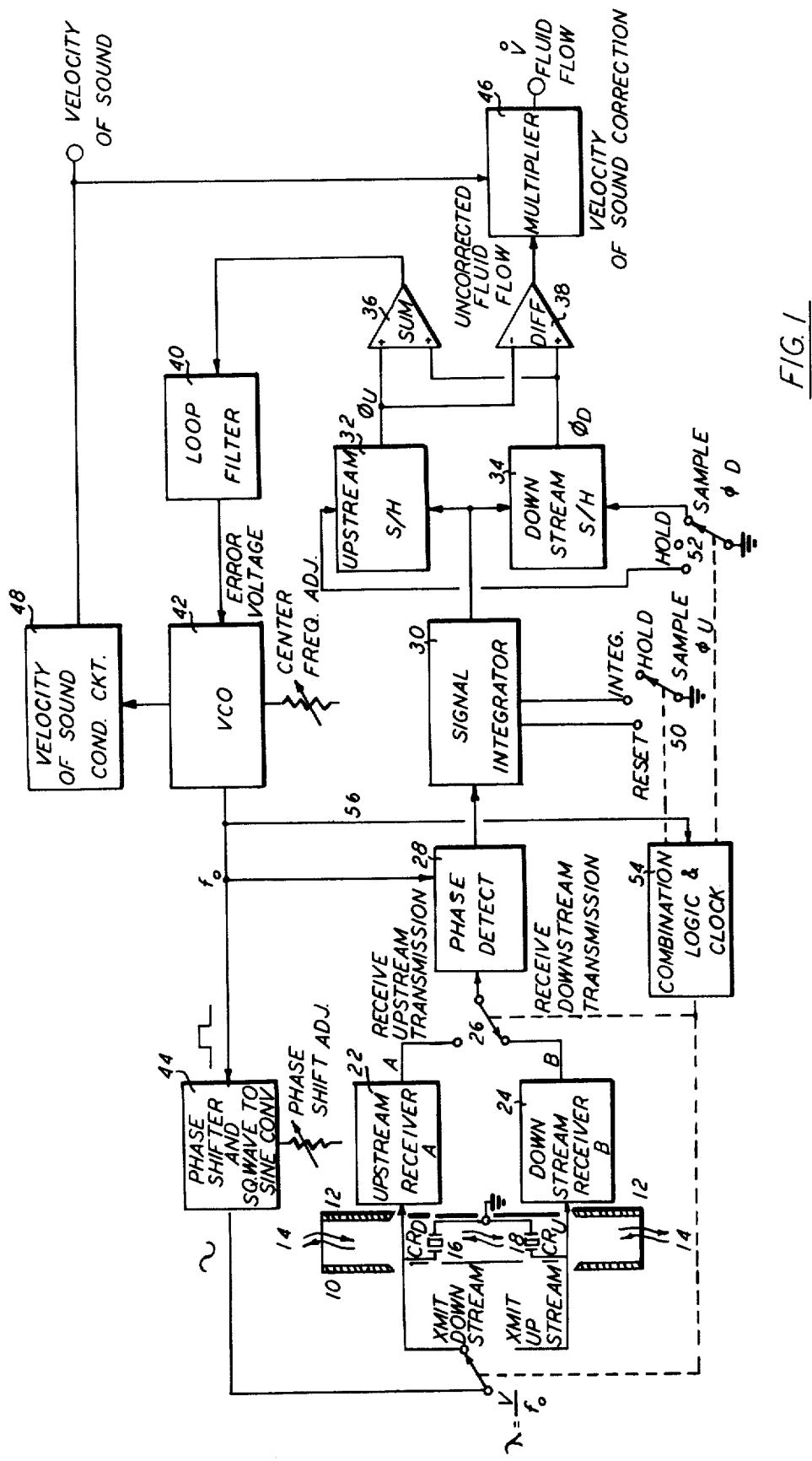
FIG. 1 is a simplified block diagram of the flowmeter system of the invention.

FIG. 1 illustrates the flowmeter system of the present invention which includes a transducer assembly 10, shown in longitudinal section, which comprises a substantially cylindrical body having a central cylindrical opening, or bore 12, through which a fluid medium flows in both directions, as indicated by the arrows 14.

The transducer assembly is made generally in accordance with the description in the U.S. Patent to DeWath, supra, and is provided with spaced apart cylindrical crystal transducers whose inner diameters are substantially coextensive with the cylindrical bore 12 so that the wall is substantially uniform with no obstructions or cavities to provide a place for particulate matter to collect or to provide an impediment for the flow of fluid therethrough. The purpose of the transducers is described in the DeWath patent and in the Hall and Loveland patent, supra.

While the Hall and Loveland patent also showed and described, in great detail, control circuitry for operating the crystal transducers to accomplish the desired results, for the purpose of this invention, this circuitry has been simplified into block diagrams and reference can be made to this patent if more detailed information on the operation of the circuit is thought necessary.

As can be seen in FIG. 1, the two ultrasonic crystal transducers, represented by crystals 16 and 18, also identified as $CR_D$ and $CR_U$, are alternately each connected to the transmission control circuitry via a switching mechanism 20. When one transducer is connected to the transmission circuitry via switching mechanism 20, the other transducer is in the receive mode, the output of which, in turn, is connected via a second switching mechanism 26 to a phase detector 28, a signal integrator 30 and two sample-and-hold circuits 32 and 34, identified as upstream and downstream. The outputs of these two sample-and-hold circuits are connected to two operational amplifiers, one identified as a summing amplifier 36 and the other identified as a difference amplifier 38. The output of the summing amplifier 36 will indicate the velocity of sound and the output of the difference amplifier will indicate the magnitude and direction of the measured fluid flow. The output of the summing amplifier is connected to a loop filter 40 and to a voltage controlled oscillator 42 (VCO) which is connected back to the phase detector 28 and to a phase shifter and square-wave-to-sine wave converter 44. The phase shifter and converter 44 output is connected back to the first switching mechanism 20. Also like the summing amplifier, the output of the difference amplifier 38 is connected to the VCO 42 but through a multiplier 46 and a velocity of sound conditioning circuit 48. One output of the multiplier is the magnitude and direction of the fluid flow as stated above and the second output represents the relative velocity of sound. Shown connected by dotted lines are the first and second switching mechanisms 20 and 26 and two additional switching mechanisms 50 and 52 all under the control of a combinational logic and clock circuit 54. The circuit 54 alternates transmit and receive functions of the two crystal transducers 16 and 18, alternates the output of the upstream and downstream receivers 22 and 24, operates the integrator 30 between reset, integrate and hold functions and, finally, operates the upstream and downstream sample-and-hold circuits 32 and 34 through a sample, hold, and sample function.

As shown in this Figure, the ultrasonic crystals 16 and 18 are alternately switched into either the transmit or receive mode by the combinational logic circuit. Thus, while one crystal is receiving, the other crystal is transmitting.

For each transmit/receive cycle, the phase difference between the transmit signal and the received signal is detected by the phase detector 28. The average value is determined for each transmit/receive cycle by the integrator circuit 30 which goes through an integrate, hold and reset mode for each transmit/receive cycle. During each integrator hold period, the respective sample/hold circuit for the upstream phase and the downstream phase is ready to accept the new signal (sample mode) as data is available at the integrator output. The upstream and downstream sample/hold circuits are updated with new data at the end of each respective transmit/receive cycle and stores (holds) the information during the wait period.

In the differential amplifier 38, the stored values are then subtracted with the output indicating the direction and magnitude of the fluid flow. In addition, the same stored values are added together in the summing amplifier to determine if a common mode change has occurred in the fluid medium. A common mode change is caused by a change in the velocity of the ultrasound which, in turn, may be due to either temperature or fluid species change. The result is that the sum of the upstream and downstream data, held by the respective sample-and-hold circuits, changes in a manner which causes an error voltage signal at the voltage controlled oscillator (VCO) 42 input to change the transmit frequency in a direction which returns the wave length of the ultra-sound frequency to its original value thereby keeping the wave length constant.

The components of the control circuitry thus far described correspond to the control circuitry of the flowmeter system of the Hall and Loveland patent; it being understood that the foregoing is a simplification of the patented control cicuitry. For example, the switching mechanism 20 in this disclosure is actually a combination of high speed transistorized switches comprised of transistors Q1 thru Q8 controlled from the clock source by pulses X,Y,Q3 and $\overline{Q3}$ applied to their respective inputs, switching mechanism 26 are transistors Q9 and Q10 with pulses A and B applied to their respective inputs, etc. Other switching mechanisms exist in the circuitry of the patent through the operation of the clock source but otherwise the block diagrams correspond to the patented circuitry. It is understood that the other switching mechanisms were shown here to illustrate the operation of the circuitry in the block diagram only.

As herein above stated, this invention improves the patented system by providing a phase shifter which is insensitive to frequency changes in the system and providing a means for calibrating a system without the need of an external source of fluid.

Figure 2:
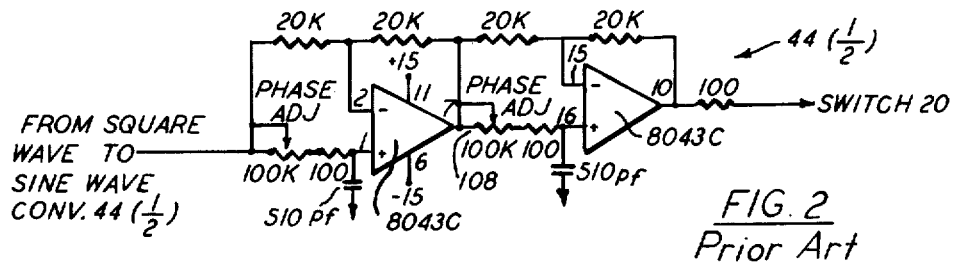
FIG. 2 is an illustration of the prior art phase adjuster for initial calibration.

First, however, attention is directed to FIG. 2 which illustrates the patented phase adjuster and to FIG. 1 where the phase adjuster is represented. As pointed out in the patent, the two 8043C operational amplifiers with adjustment resistors being operative to adjust the phase of the signal during calibration of the flowmeter and are preferably adjusted to a selected transmission frequency with no fluid flow through the transducer assembly 10. As pointed out, however, it was found that the phase adjuster of the patented circuitry changed as a function of frequency which produced an error such that the entire phase lock loop made an adjustment as if this error was a phase error due to a change in density, wherein, in fact, it was only an error in the phase adjusting circuitry.

Figure 3:
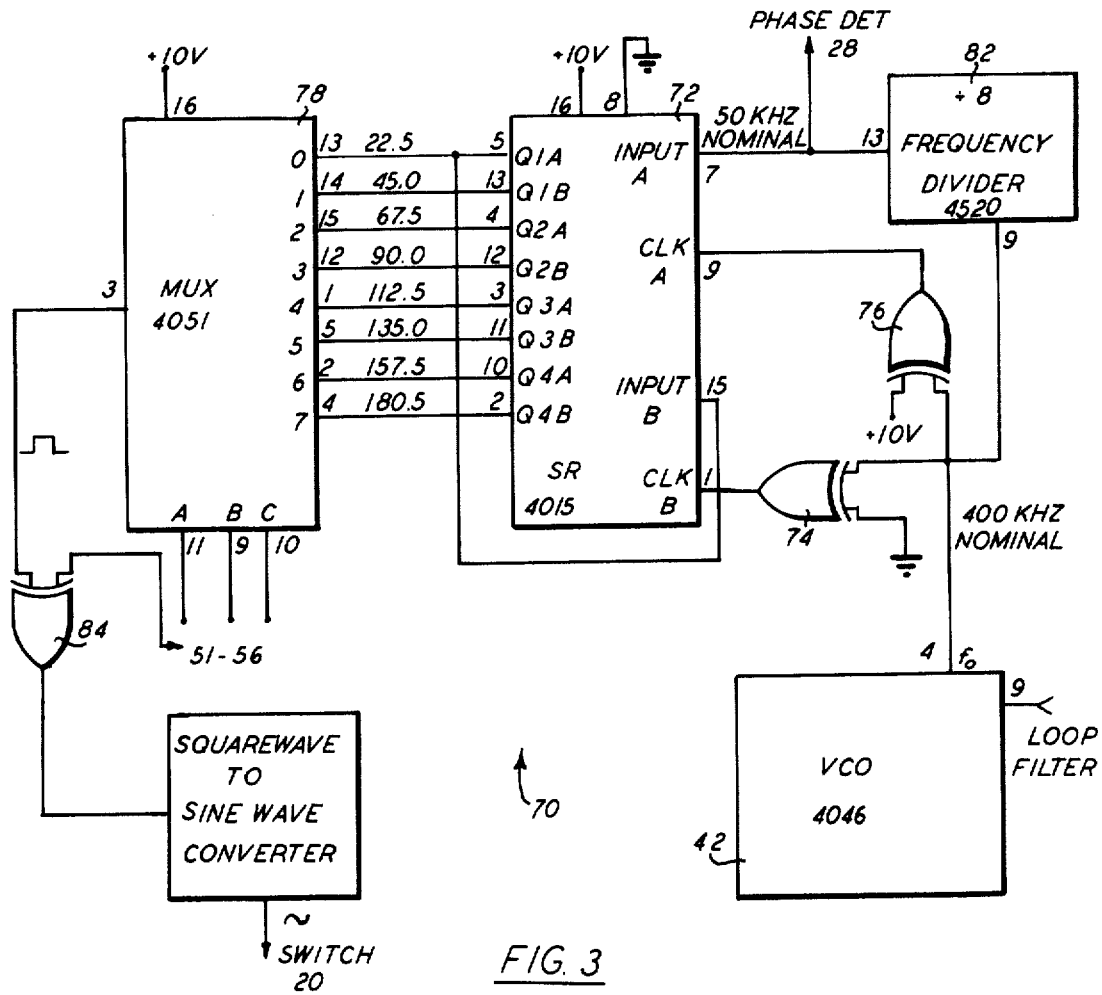
FIG. 3 illustrates the digital phase shifter and calibration of the present invention.

Turning now to FIG. 3, there is shown a digital phase shifter and calibrator 70 which is insensitive to frequency changes and which may be used to calibrate the system.

As can be seen from this Figure, the digital phase shift generator is a dual 4 bit shift register 72 (MC14015BCP) connected to the VCO 42 through a pair of exclusive OR gates 74 & 76 (MC14070BCP). The pair of exclusive OR circuits provide clock signals to each half of the dual two shift register which are 180° out of phase thereby causing each register to shift alternately. The outputs of the shift register 72 are connected to an 8 channel multiplexer 78 (MC14051BCP) which, in turn, is connected to the square-wave-to-sine wave converter 80. Square wave-to-sine wave converter 80 in this figure is shown and identified separately for sake of clarity although shown as part of the phase shifter in FIG. 1. The signal of 400 kilohertz, from the VCO is applied to the input pin 9 of the dual up counter 82 which divides the VCO frequency by 8 to obtain the transmit frequency. The dual shift register advances the input signal to the next logic storage unit at each clock pulse which is eight times the transmit frequency. Note that the input to the "B" shift register is an output of the "A" shift register which is displaced by 22.5° relative to the input to the "A" shift register. This enables shifting of transmit signal to take place essentially every 22½ degrees. The net result is to have the eight outputs from the shift register Q1A,Q2A . . . Q4A,Q4B which are 22½ degrees apart. Each of these outputs are connected to multiplexer 78 and then to an exclusive OR circuit 84 where the phase may be shifted 180°. Thus, the output of the phase shifter circuitry may be shifted from 0° to 360° in 22½° increments. The phase shift thru this circuitry may be chosen by a switching sequence of switches S1–S6 applied to logic pins A,B, C and exclusive OR circuit 84, which command a certain signal phase to appear at the output and subsequently transmitted out. Also, by utilizing these control switches, the calibrate mode may be enabled which causes the phase of the transmitted signal to change from plus 90° to minus 90° for alternate transmit cycles thereby simulating that which would happen with a calibrated flow. Additionally, the phase of this signal can be changed so that the output either represents a plus ½ of full scale (liters per second) or a minus ½ of full scale (liters per second).

It should be apparent from the foregoing that this invention may be incorporated into the circuitry of the Hall and Loveland patent, supra, to improve its performance, or may be incorporated in circuitry improved by the incorporation of any one or all of the inventions identified under Related Applications supra into a circuit to improve the performance of such circuitry. If the invention of the Application Ser. No. 224,783 is not used, of course, line 56, shown herein, would be omitted.

What is claimed is:

1. A flowmeter system comprising, in combination:
   transducer means for transmitting acoustic compression waves upstream and downstream in a fluid flowing in a path in response to transmit signals;
   circuit means for measuring the phase difference between the transducer means in the fluid flow path of the acoustic compression waves transmitted upstream and circuit means for measuring the phase difference between said transducer means in the fluid flow path of the acoustic compression waves transmitted downstream;
   circuit means for producing a difference signal dependent on the difference between the two phase differences, the magnitude and sign of which being directly related to the instantaneous fluid flow rate and its direction;
   circuit means for automatically adjusting the frequency of the acoustic compression waves to a frequency where a fixed wavelength distance, in the fluid flow medium, occurs across the path of the transducer means; and
   digital means for generating calibration signals connected to said means for adjusting the frequency of the acoustic compression waves so as to simulate fluid flow in said path in response to signals from said transducer means and said means for adjusting the frequency of the acoustic compression waves for adjusting the phase of the transmit signals during initial calibration of the system to compensate for variations in transducer elements and to calibrate the system for use without the need of a flow in said path.

2. The flowmeter system as claimed in claim 1 wherein said adjusting and calibrating means is connected to the output of said circuit means for automatically adjusting the frequency of the compression waves and wherein the output signals therefrom are divided down into submultiple signals representing degrees of phase of the transmitted signals to be applied to a transducer, and means for selecting which phase is to be applied to said transducer to simulate flow in said path.

3. The flowmeter system as claimed in claim 1 wherein said automatic frequency adjusting means is a voltage controlled oscillator which generates output signals at a frequency depending on a voltage applied thereto,
   means connected to the output of said oscillator for dividing down the frequency of said output to selected signals which are submultiples of said frequency,
   a shift register,
   means for storing said submultiple signals in said shift register,
   means for changing said output signals into two frequency signals 180° out of phase from the other and applying said two frequency signals as a clock source to said shift register for shifting said submultiple signals out of said shift register,
   multiplexing means connected to the shift register, and
   means for selectively actuating said multiplexing means to direct which of said submultiple signals is to be directed as a phase shift signal to said transducer.

4. A flowmeter system for measuring a fluid along a path comprising in combination:
   means defining a path for confining a fluid flow;
   a first and second transducer disposed along said path;
   a transducer control circuit coupled to said first and said second transducers to cause said first transducer to produce first acoustic compressions in the fluid and said second transducer to produce a first received signal when said first acoustic compressions are sensed thereby during a first transmit-receive cycle and to cause said second transducer to produce second acoustic compressions in the fluid and said first transducer to produce a second received signal when said second acoustic compressions are sensed thereby during a second transmit-receive cycle;
   said control circuit including:
   means to switch from said first to said second transmit-receive cycle;
   first measurement means to measure a first phase difference comprising the phase difference between the first acoustic compression produced at said first transducer and said first received signal produced by said second transducer during each said first transmit-receive cycle;
   second measurement means to measure a second phase difference comprising the phase difference between the second acoustic compression produced at said second transducer and said second received signal produced by said first transducer during each second transmit-receive cycle;
   difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path;
   means to automatically adjust the frequency of the acoustic compressions produced by each said transducer to a frequency where a fixed wavelength distance in the fluid flow medium occurs across the distance of either said transducer, thereby maintaining operation at the acoustic resonance to maximize the magnitude of the received signal produced at the other transducer so that said difference signal output of the meter is insensitive to the velocity of sound in the fluid; and
   digital means connected to and responsive to said automatic frequency adjusting means for generating a plurality of signals each of which are shifted in phase with respect to the frequency of the automatic frequency adjusting means, and means for selecting which of said plurality of signals are used for adjusting the phase of the first and second acoustic compressions during a no flow condition.

5. The flowmeter as claimed in claim 4 wherein said digital means comprises,
   a shift register with multiple output means for applying the output of said automatic frequency adjusting means to said shift register as two out-of-phase clock signals,
   means for dividing the output of said automatic frequency adjusting means into signals of lesser frequency and storing the latter in said shift register,
   said clock signals shifting said signals of lesser frequency out of said multiple outputs.

6. The flowmeter system as claimed in claim 5 wherein said selecting means is a switch operated multiplexer.

7. The flowmeter system as claimed in claim 6 wherein said selected signal is digital and circuitry is provided between said multiplexer and said transducer for changing said digital signal into an analog signal.

8. The flowmeter system as claimed in claim 7 wherein said automatic frequency adjusting means is a voltage controlled oscillator.

9. A flowmeter system comprising:
   means defining a path for confining the flow of a fluid medium therethrough,
   first and second transducers disposed along said flow path and connected to circuitry which includes a voltage controlled oscillator and a switching means for alternately generating and receiving acoustic compression waves in the fluid medium by and between the transducers and means for generating a signal in response to the received acoustic compression waves,
   said circuitry being of the phase lock loop type and further including,
   phase detector means for measuring the phase difference between the transmitted acoustic compression waves and the received acoustic compression waves,
   means connected to said phase detector means for producing a sum signal and a difference signal dependent upon the measured phase difference,
   said sum signal being transmitted to said voltage controlled oscillator for adjusting the frequency of the acoustic compression waves to maintain the length of said waves constant in the fluid medium as a measure of fluid density,
   means responsive to said difference signal for generating signals representing the direction and magnitude of the flow of the fluid medium, and
   digital means connected to and responsive to said voltage controlled oscillator for generating signals at phases different from the phase of the voltage controlled oscillator and applying said signals to said transducers to simulate flow of fluid without the need of an actual flow of fluid in said path to calibrate said system.

* * * * *